United States Patent [19]
Hamid et al.

[11] Patent Number: 5,938,925
[45] Date of Patent: Aug. 17, 1999

[54] PROGRESSIVE GAP SAND CONTROL SCREEN AND PROCESS FOR MANUFACTURING THE SAME

[75] Inventors: Syed Hamid; Ralph H. Echols, both of Dallas; Colby M. Ross, Carrollton, all of Tex.

[73] Assignee: Halliburton Energy Services, Inc., Dallas, Tex.

[21] Appl. No.: 08/787,614

[22] Filed: Jan. 23, 1997

[51] Int. Cl.⁶ .................................................. E21B 43/08
[52] U.S. Cl. ................ 210/497.1; 210/499; 166/231; 29/896.61; 29/33 F; 29/340; 29/902; 29/905; 29/DIG. 77
[58] Field of Search ............................. 210/356, 497.01, 210/357, 359, 497.1, 499, 493.4; 166/357, 265, 231, 232, 234, 902; 29/896.61, 435, 34 D, 33 F, 902, 905, DIG. 77

[56] References Cited

U.S. PATENT DOCUMENTS

| | | | |
|---|---|---|---|
| 3,584,685 | 6/1971 | Boyd | 166/231 |
| 4,068,713 | 1/1978 | McGuire | 166/233 |
| 4,200,150 | 4/1980 | Saadeh et al. | 166/231 |
| 4,428,423 | 1/1984 | Koehler et al. | 166/231 |
| 4,494,603 | 1/1985 | Harguindey | 166/231 |
| 5,152,892 | 10/1992 | Chambers | 210/493.4 |

*Primary Examiner*—David A. Reifsnyder
*Attorney, Agent, or Firm*—Paul I. Herman; Lawrence R. Youst

[57] ABSTRACT

A progressive gap sand control screen comprising a plurality of parallel ribs spaced around an axis and a screen wire wrapped around the plurality of ribs having turns which extend along the length of the plurality of ribs such that adjacent turns have gaps therebetween, the gaps forming a gap profile in which the gaps near the upper end of the sand control screen are narrower than the gaps near the lower end of the sand control screen, the width of the gaps near the upper end of the sand control screen being less than the diameter of the particles which cause erosion, the gap profile includes a variable gap section near the upper end of the sand control screen and a constant gap section below the variable gap section, the variable gap section having a linear profile, a step type profile, or a nonlinear profile.

18 Claims, 9 Drawing Sheets

PROGRESSIVE GAP SAND CONTROL SCREEN AND PROCESS FOR MANUFACTURING THE SAME

TECHNICAL FIELD OF THE INVENTION

This invention relates in general, to a sand control device used during the production of oil, gas or water, and in particular to, a sand control screen having a gap profile in which the gaps near the upper end of the sand control screen are narrower than the gaps near the lower end of the sand control screen and a manufacturing process related to the same.

BACKGROUND OF THE INVENTION

Since the beginning of oil production from subsurface formations, the industry has been concerned with efficient control of the movement of unconsolidated formation particles, such as sand, into the wellbore. For example, such particle movement commonly occurs during production from completions in loose sandstone or following hydraulic fracture of a formation. Production of these materials causes numerous problems in the operation of oil, gas or water wells. These problems include plugging of formations, tubing and subsurface flow lines, as well as erosion of tubing, downhole equipment and surface equipment. These problems lead to high maintenance costs and unacceptable well downtime. Accordingly, numerous methods have been utilized to control the movement of unconsolidated particles during the production of fluids.

Gravel packing is one of the most common methods to prevent the production of sand. Generally, gravel packing involves placing pack sand, an aggregate or particulate material, in the annular space between the wellbore and a fluid permeable, perforated base pipe that is located adjacent to the production zone. A particular pack sand is selected to prevent the flow of formation particles therethrough, taking into consideration the characteristics of the particular reservoir. The perforated base pipe is designed to allow production fluids to flow therethrough with minimum resistance, while preventing both the pack sand and the formation particles from flowing into the production string. Gravel packing is commonly achieved by either an open hole gravel packing procedure or an internal gravel packing procedure, depending on the characteristics of the particular reservoir.

In addition to the use of a perforated base pipe and gravel packing, a sand control screen is commonly employed to control the movement of formation particles. These screens may comprise a continuous single wire wrapped around the base pipe. While this type of screen is capable of excluding even the smallest API grades of pack sand, these screens are easily damaged during handling, installation and production.

More recently, a sand control screen comprising a sand control screen jacket has been used. The screen jacket is fully formed from a single wire prior to attachment to the base pipe. Commonly, a plurality of ribs extend longitudinally along the internal surface of the screen jacket to provide strength to the wire and stand-off between the wire and the base pipe once the screen jacket is attached. In addition, some screen designs use prepacked sand confined around the perforated base pipe. These prepacked screens are constructed by fabricating the metal components, then forcing pack sand, either resin coated or uncoated, between the perforated base pipe and an inner wire screen or between an inner wire screen and an outer wire screen of a multi-layer screen.

It has been found, however, that whether single or multi-layer, conventional or prepacked, sand control screens are susceptible to erosion. This erosion process is particularly problematic during gravel packing, high rate water packing, or frac packing operations. There are three critical factors which are necessary for erosion of the sand control screen to occur, which are fines, velocity and time, that is, there must be fines traveling through the screen at a sufficient velocity for a sufficient period of time.

Fines are defined as any particle which can travel between the gaps in a sand control screen. The fines, however, must have a sufficient mass in order to cause damage. This critical mass occurs at roughly 50 microns. Also, the fines must be traveling at a high enough velocity in order to have the kinetic energy necessary to dislodge particles of metal as the fines impinge the sand control screen surface. Along with high velocity fines, the erosion process requires time in order to damage the sand control screen. In as little as two minutes, however, high velocity fines can damage a sand control screen to the extent that a typical 40/60 or 50/70 pack sand can travel through the eroded area of the sand control screen into the production string with virtually no resistance.

Sand control screens are particularly susceptible to erosion near the top of the screen due to the way sand fills a wellbore. For example, during gravel packing, sand fills the wellbore from the bottom toward the top. The fluid in the gravel pack slurry enters the pipe string through the gaps in the screen and the perforations in the base pipe. During the initial stages of gravel packing, the pressure required to pump fluid down the wellbore and up through the pipe string is relatively low due to the number of gaps in the screen which are available for fluid flow. The relatively low pressure allows sand to bridge off gaps even when the diameter of the sand is less than the width of the gaps. As the gaps near the bottom of the screen bridge off, sand forms a diagonal front which moves up the wellbore such that the sand near the screen is higher than the sand near casing. As the sand front moves up the wellbore, the pressure required to pump fluid through the system increases. Along with this increase in pressure comes an increase in the velocity of fluid traveling through the available gaps in the screen.

As the pressure increases, it becomes more difficult for sand to bridge off the gaps of the screen that are wider than the diameter of the sand. Thus, the top of the screen is most susceptible to erosion because the pressure and the velocity are greatest when the sand front approaches the top of the screen.

Therefore, a need has arisen for a sand control screen apparatus for filtering particles out of fluid produced from a wellbore that will not erode during gravel packing, high rate water packing or frac packing particularly under the critical conditions experienced near the top of the screen and that is capable of withstanding severe downhole conditions during installation and production.

SUMMARY OF THE INVENTION

The present invention disclosed herein is a progressive gap sand control screen that comprises a sand control screen apparatus for filtering particles out of fluid produced from a wellbore that is capable of withstanding severe downhole conditions during installation and production and does not experience erosion near the top of the screen during gravel packing, high rate water packing, or frac packing.

The sand control screen apparatus of the present invention comprises a base pipe that is threadably connected to a pipe string and a sand control screen having an upper end and a lower end that is securably attached to the base pipe. The sand control screen is formed by wrapping a screen wire around a plurality of parallel ribs disposed about an axis. The screen wire forms turns which extend along the length of the plurality of ribs. Adjacent turns of the screen wire have gaps therebetween creating a gap profile in which the width of the gaps near the upper end of the sand control screen is less than the width of the gaps near the lower end of the sand control screen. The width of the gaps near the upper end of the sand control screen is smaller than the diameter of particles which cause erosion. For example, the gaps near the upper end of the sand control screen may be less than 50 microns, thereby blocking particles which cause erosion while providing a flow path for fluids.

The progressive gap sand control screen of the present invention may be deployed in a variety of embodiments. In one embodiment, the progressive gap sand control screen of the present invention may have a gap profile which includes a variable gap section at the upper end of the sand control screen and a constant gap section below the variable gap section. In another embodiment, the progressive gap sand control screen of the present invention may have a gap profile which includes a solid wound section at the upper end of the sand control screen, a variable gap section below the solid wound section and a constant gap section below the variable gap section. In either embodiment, the variable gap section may have a linear gap profile, a step type profile or a nonlinear gap profile.

BRIEF DESCRIPTION OF THE DRAWINGS

For a more complete understanding of the present invention, including its features and advantages, reference is now made to the detailed description of the invention, taken in conjunction with the accompanying drawings in which like numerals identify like parts and in which:

FIG. 3, including

FIG. 5, including

DETAILED DESCRIPTION OF THE INVENTION

While the making and using of various embodiments of the present invention is discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the invention.

Figure 1:
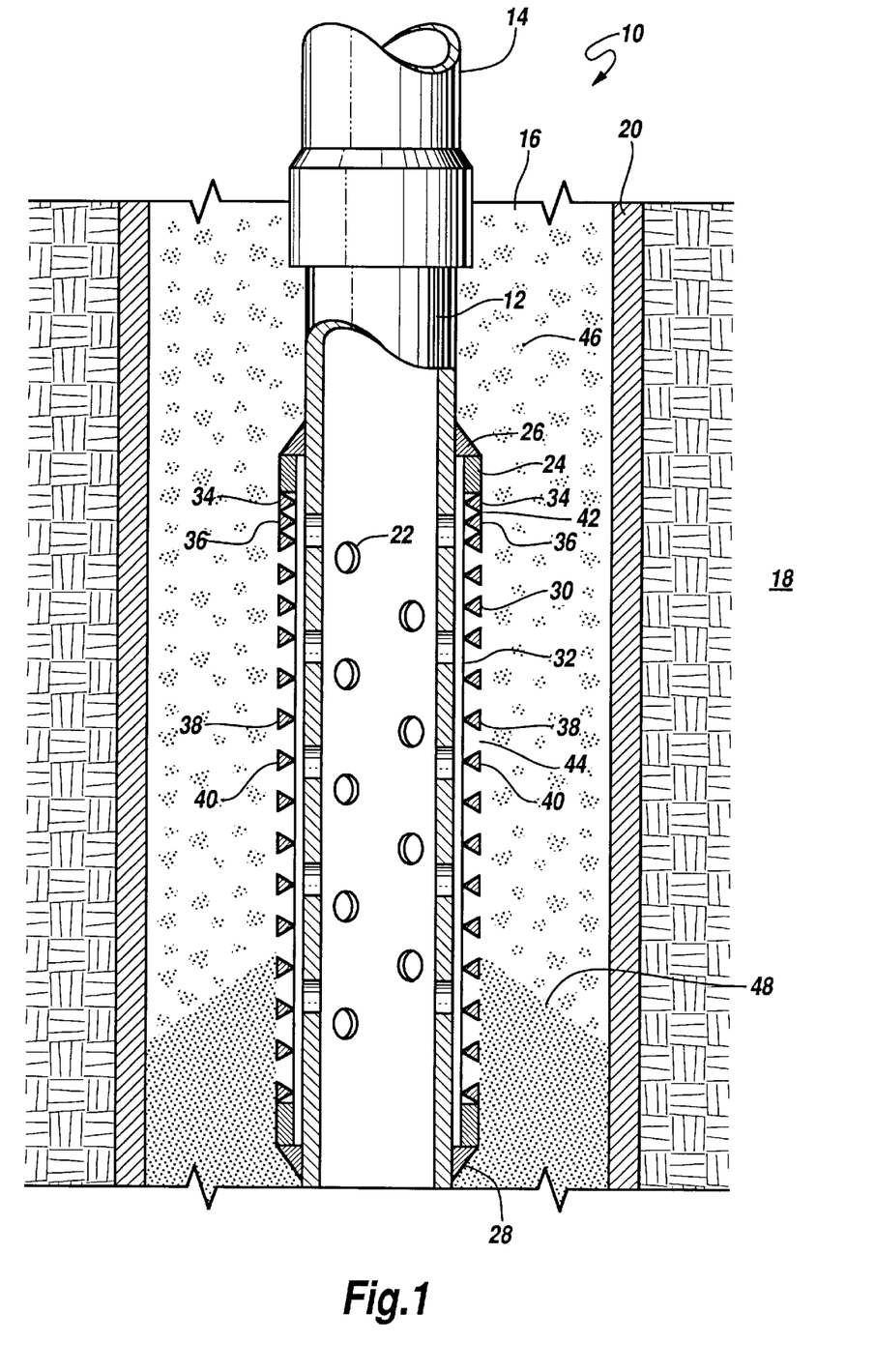
FIG. 1 is a side elevation, partially cut away, showing a portion of the production system, including a progressive gap sand control screen apparatus of the present invention.

Referring to FIG. 1, a progressive gap sand control screen apparatus is depicted and is generally designated 10. Base pipe 12 is threadably engaged with pipe string 14 which extends through wellbore 16 into production zone 18. Wellbore 16 is surrounded by casing 20. Even though FIG. 1 depicts a cased vertical well, the progressive gap sand control screen apparatus of the present invention is equally well-suited for uncased wells, deviated wells or horizontal wells.

Base pipe 12 has a series of openings 22 along its length to allow for the production of fluids therethrough. The number, size and shape of openings 22 are not critical to the present invention, so long as sufficient area is provided for fluid production and pipe integrity is maintained.

Progressive gap sand control screen 24 is attached to base pipe 12 at welds 26 and 28. Screen 24 may be constructed from material such as 304 stainless steel, 316 stainless steel, Hastelloy, Inconel or Monel. Even though FIG. 1 depicts screen 24 as being welded to base pipe 12, it should be understood by one skilled in the art that screen 24 may be attached to base pipe 12 in a variety of ways including, but not limited to, mechanical connections.

Screen 24 comprises screen wire 30 which is wrapped around a plurality of parallel ribs 32 which form a generally cylindrical structure about which to wrap screen wire 30. As screen wire 30 is wrapped around ribs 32, screen 24 is formed by adjacent turns, for example, turns 34, 36 and turns 38, 40. Between adjacent turns 34 and 36 is gap 42. Between adjacent turns 38 and 40 is gap 44. In general, the gaps near the upper end of screen 24 are narrower than the gaps near the lower end of screen 24. For example, the width of gap 42 is less than the width of gap 44. The width of gap 42 is also less than the diameter of particles which cause erosion.

Erosion of screen 24 is particularly likely during certain well operations such as gravel packing, high rate water packing or frac packing. For example, during gravel packing, a slurry of fluid (not pictured) and sand 46 is pumped down wellbore 16 to fill the annular area between casing 20 and base pipe 12 with sand 46 to control the movement of unsolidated formation particlesinto pipe string 14.

As explained above, screen 24 is particularly susceptible to erosion near the upper end of screen 24. During the gravel packing process, for example, sand 46 fills wellbore 16 from the bottom toward the top. As the gaps near the bottom of screen 24 bridge off, sand 46 forms a diagonal front 48 which moves up wellbore 16, that is, the sand near screen 24 is higher than the sand near casing 20. As sand front 48 moves up wellbore 16, the pressure required to pump fluid through the system increases which increases the velocity of fluid traveling through the available gaps in screen 24. The top of screen 24 is most susceptible to erosion because the pressure and the velocity are greatest as sand front 48 approaches turns 34, 36 and gap 42.

Screen 24 of the present invention does not experience erosion even during high velocity and high pressure conditions when sand front 48 reaches turns 34, 36 and gap 42. Unlike gap 44, in a lower part of screen 24, sand 46 does not have to bridge off gap 42 in that the width of gap 42 is less than the diameter of sand 46. The narrow width of gap 42 and the other gaps near the top of screen 24 allow sand front 48 to progress above turns 34, 36 of screen 24 without eroding screen 24. Even though FIG. 1 depicts screen 24 as being a single layer screen jacket, it should be understood by one skilled in the art that the progressive gap screen of the present invention is equally well-suited for use with, for example, a sand control screen mounted directly on base pipe 12 or a multi-layer sand control screen jacket.

Figure 2:
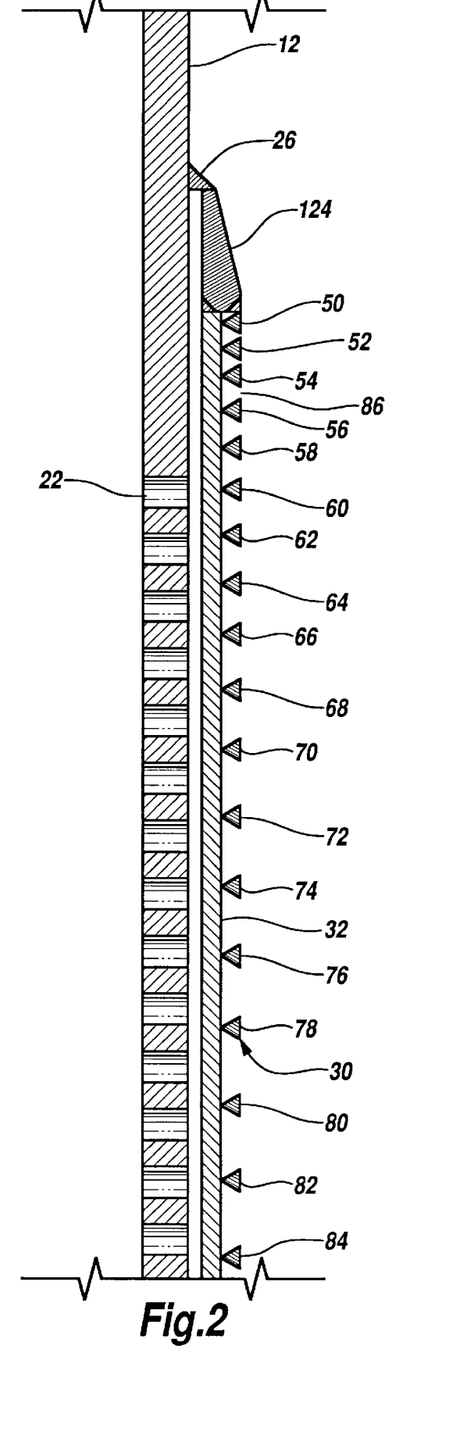
FIG. 2 is an enlarged side elevation, partially cut away, showing the upper portion of a progressive gap sand control screen of the present invention.

Referring to FIG. 2, a preferred embodiment of a progressive gap sand control screen 124 is depicted. Screen 124 is attached to base pipe 12 at weld 26. Screen 124 comprises a plurality of ribs 32 and screen wire 30 which is wrapped around the plurality of ribs 32 forming turns 50 through 84. Screen 124 has a screen profile which includes a variable gap section from turn 50 through turn 68 and a constant gap section from turn 68 through turn 84. In this embodiment, the variable gap section begins at the top of screen 124 and extends downward for two or three feet. The constant gap section begins below the variable gap section and extends to the bottom end of screen 124 which may typically be twenty feet in length.

The width of the gaps near the top of the variable gap section is less than the diameter of particles which cause erosion. For example, gap 86 may have a width between about 0.001 and 0.005 inches. The width of the gaps in the constant gap section may be between about 0.006 and 0.008 inches. It should be noted by one skilled in the art, that the gap width in the constant gap section should be selected to allow production fluids to flow therethrough with minimum resistance, while preventing both the pack sand and the formation particles from flowing into the production string.

Figure 3A:
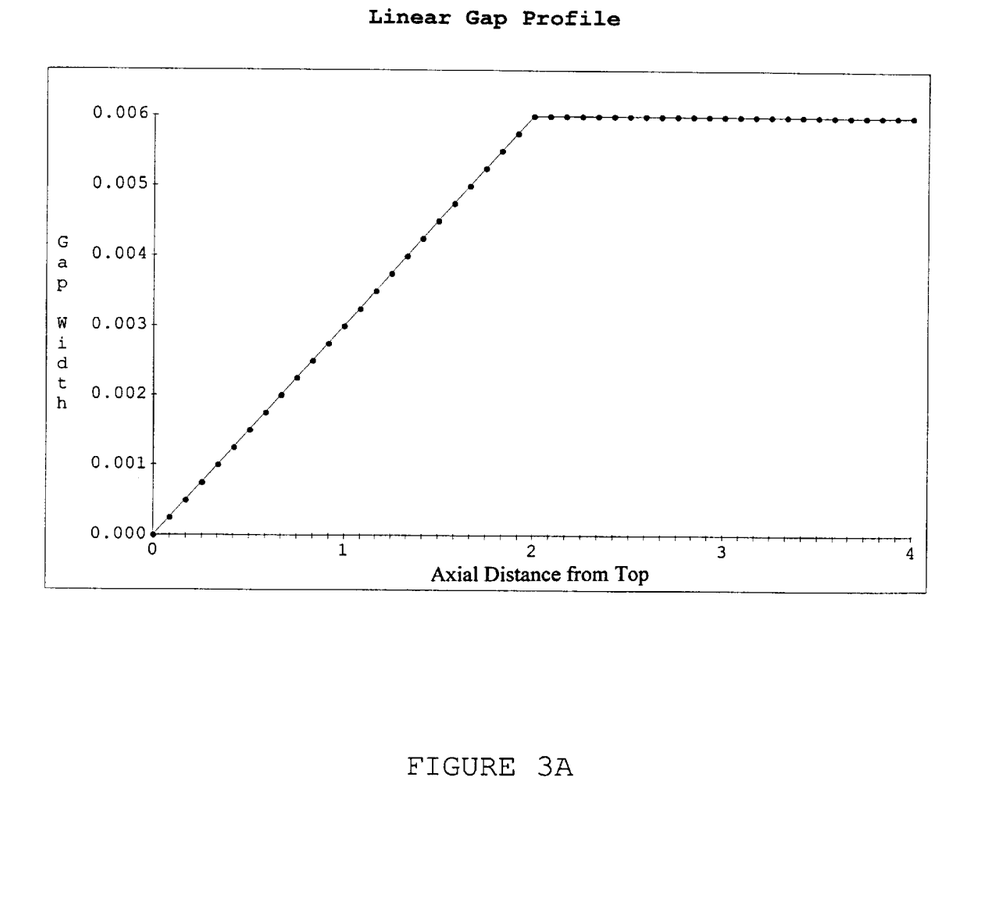
FIGS. 3A–3C, is a graphical representation of the gap profile of a progressive gap sand control screen of the present invention.
Figure 3B:
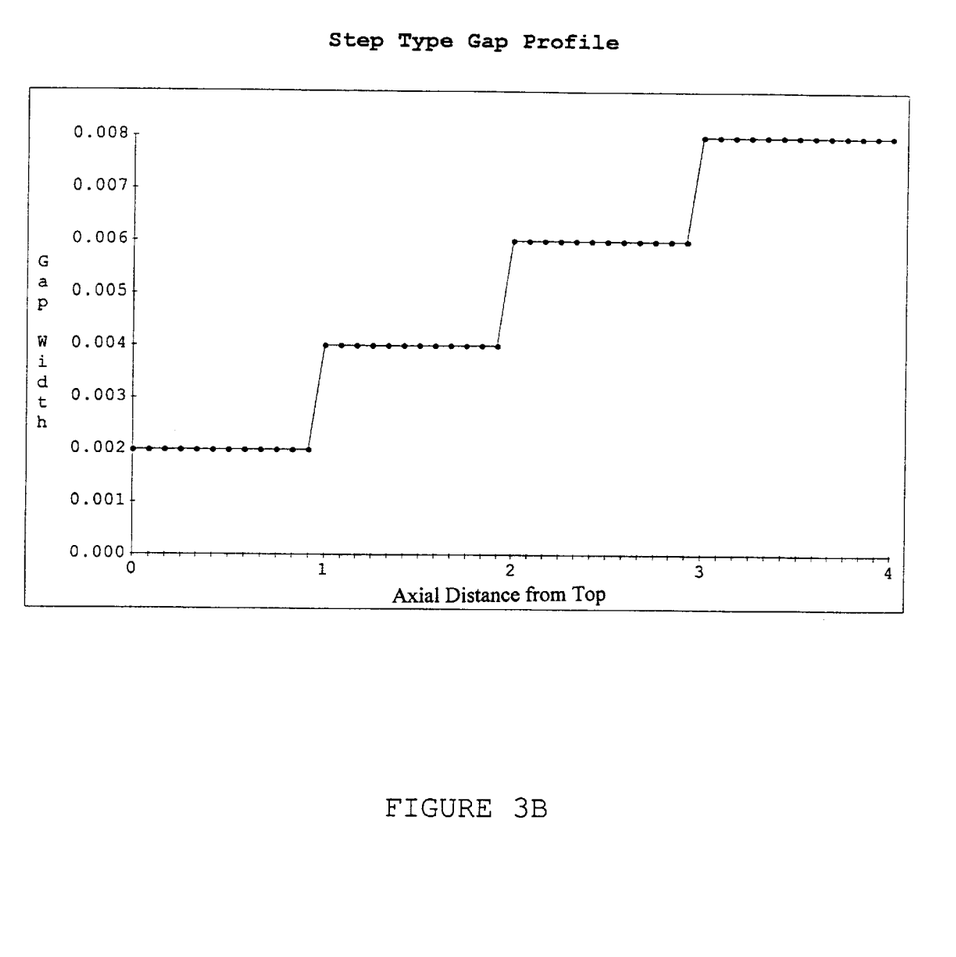
Figure 3C:
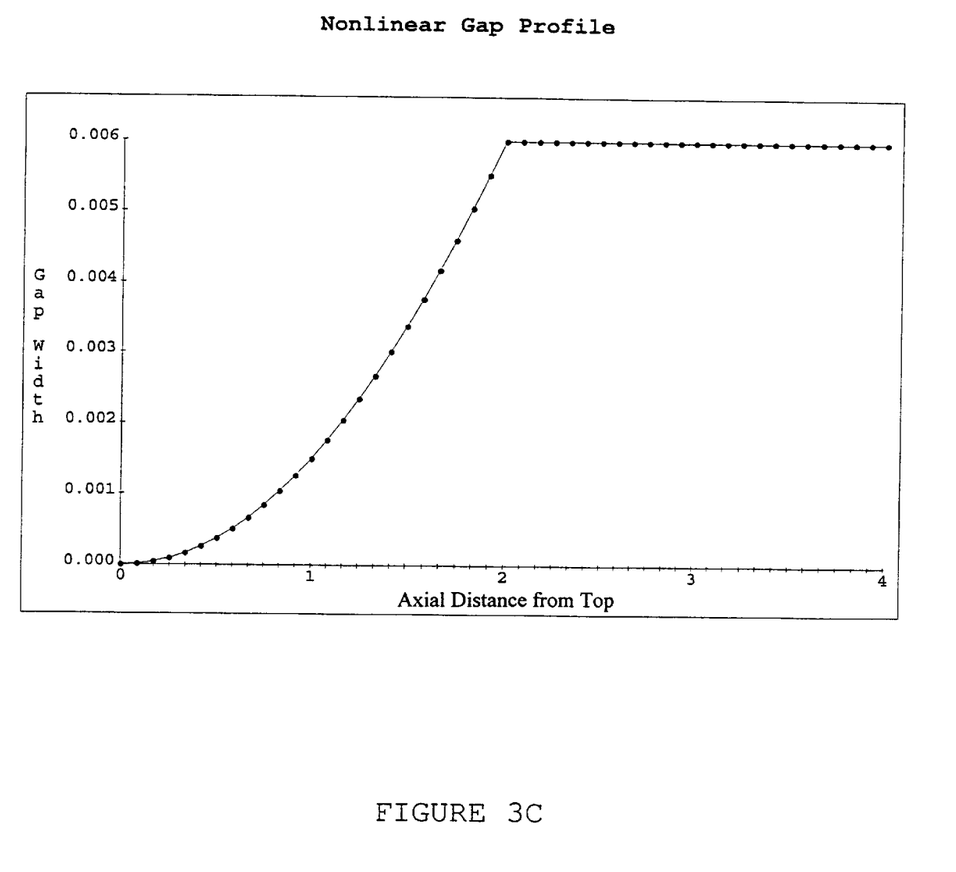

FIG. 3, which includes FIGS. 3A–3C, graphically represents preferred gap profiles for the variable gap section of screen 124. FIG. 3A represents the gap profile for the upper four feet of screen 124 and corresponds with a variable gap section which extends down two feet from the top of screen 124. In the variable gap section, the gaps have a linear profile ranging from a zero gap width at the top of screen 124 to a 0.006 inch gap width at the bottom of the variable gap section. In the constant gap section of screen 124, the gap width is 0.006 inches.

FIG. 3B represents an alternate gap profile associated with screen 124. In this embodiment, the variable gap section extends down three feet from the top of screen 124 and has a step profile. The gap width for the top one foot of screen 124 is 0.002 inches. The next one foot section of screen 124 has a gap width of 0.004 inches. The next one foot section of screen 124 has a gap width of 0.006 inches. The constant gap section of screen 124, which begins three feet from the top of screen 124 and extends to the bottom of screen 124, has a gap width of 0.008 inches.

FIG. 3C shows another alternate gap profile associated with screen 124. The variable gap section of screen 124 in this embodiment extends two feet down screen 124. At the top of screen 124 there is a zero gap width. Two feet from the top of screen 124, the gaps have a width of 0.006 inches. The gap profile in the variable gap section has a nonlinear profile with the slope of the gap profile increasing as the gap width increases down the length of the variable gap section. The gaps in the constant gap section have a width of 0.006 inches which extends to the bottom end of screen 124.

Figure 4:
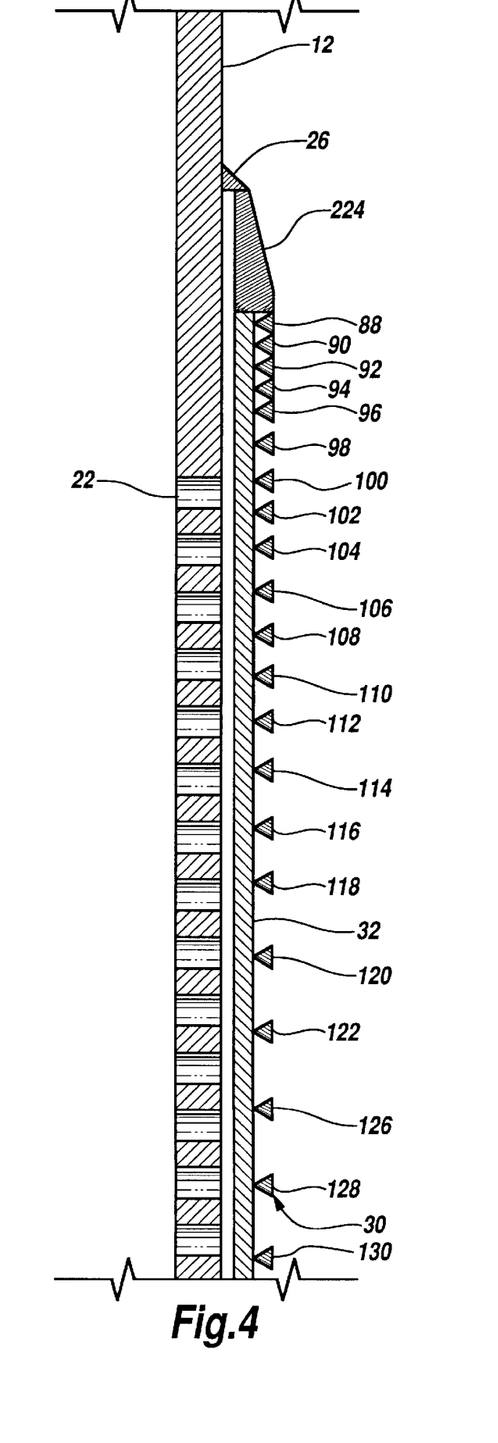
FIG. 4 is an enlarged side elevation, partially cut away, showing the upper portion of a progressive gap sand control screen of the present invention.

In FIG. 4, an alternate embodiment of the variable gap sand control screen 224 is depicted. Screen 224 is attached to base pipe 12 at weld 26. Screen 224 comprises a plurality of ribs 32 and screen wire 30 which is wrapped around the plurality of ribs 32 forming turns 88 through 122 and 126 through 130. At the top of screen 224, there is a solid wound section extending from turn 88 to turn 96. Below the solid wound section is a variable gap section extending from turn 96 to turn 118. Below the variable gap section is a constant gap section extending from turn 118 to the bottom of screen 224.

This embodiment of screen 224 is typically used in conjunction with a prepacked screen design. In prepacked screens, pack sand tends to settle between screen 224 and base pipe 12 leaving a void near the top of screen 224. Utilizing the solid wound screen wire 30 at the top of screen 224 eliminates problems associated with this void. Similarly, a solid sleeve may replace the solid wound section of screen 224 to achieve the same result.

Figure 5A:
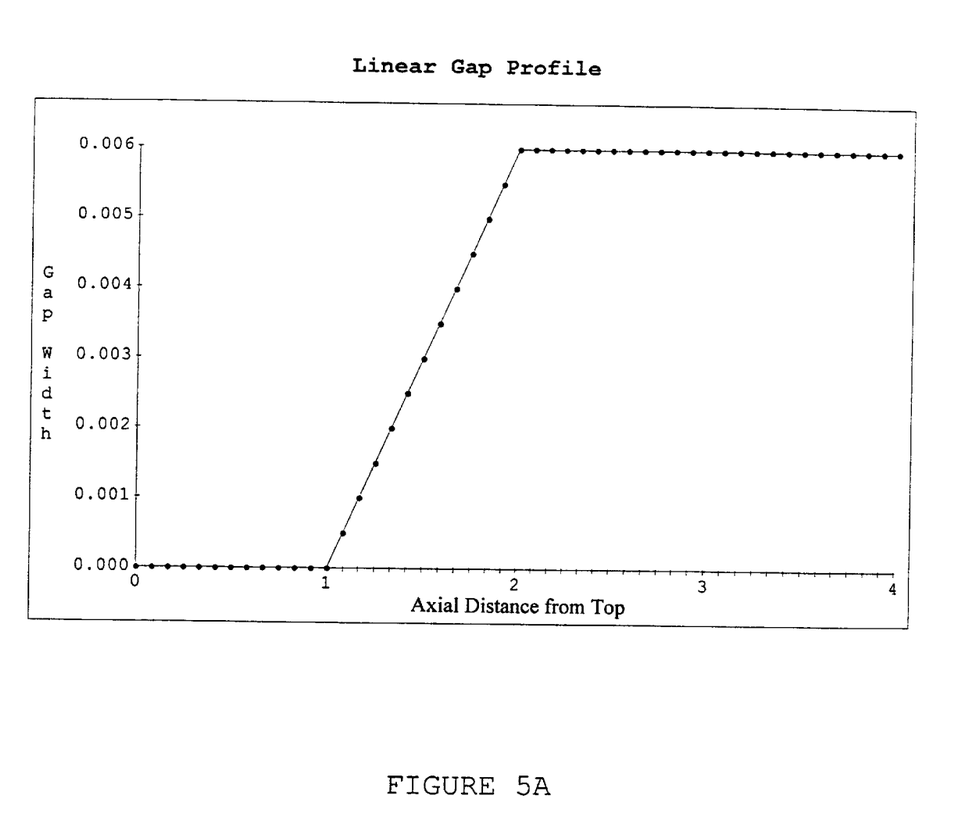
FIGS. 5A–5C, is a graphical representation of the gap profile of a progressive gap sand control screen of the present invention.
Figure 5B:
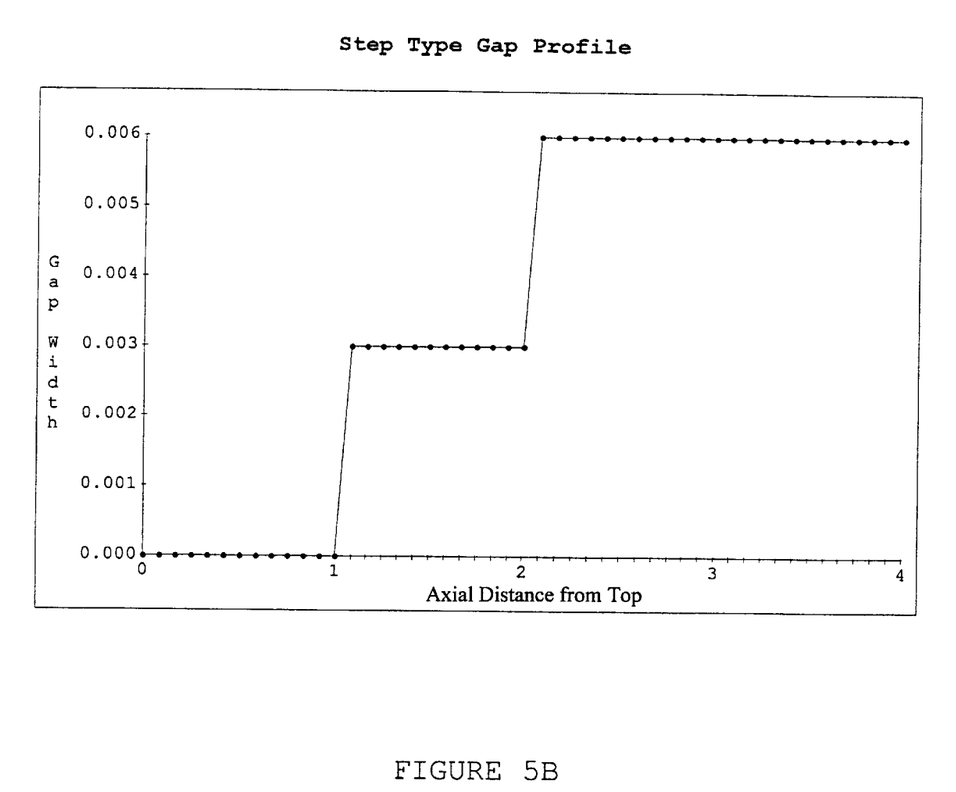
Figure 5C:
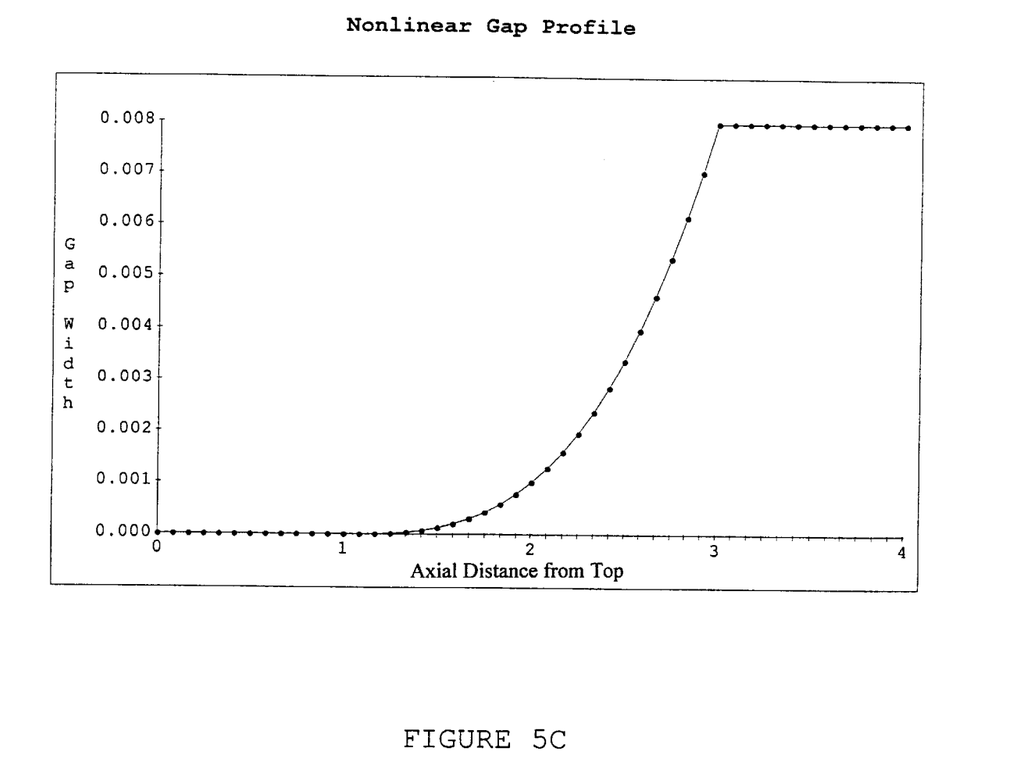

FIG. 5, including FIGS. 5A–5C, graphically represents preferred gap profiles for the variable gap section of screen 224. In FIG. 5A, the solid wound section of screen 224 extends one foot from the top of screen 224. The solid wound section of screen 224 has a zero gap width. The variable gap section of screen 224 extends for one foot below the solid wound section. The variable gap section has a linear gap profile which varies from zero inches to 0.006 inches. The constant gap section of screen 224 extends from the bottom of the variable gap section of screen 224 to the bottom of screen 224. The gap width in the constant gap section is 0.006 inches.

FIG. 5B depicts a step gap profile for screen 224. The solid wound section of screen 224 extends from the top of screen 224 for one foot and has a zero gap width. The variable gap section extends from the bottom of the solid wound section for one foot. The variable gap section includes a single step having a gap width of 0.003 inches. The constant gap section of screen 224 has a gap width of 0.006 inches which extends from the bottom of the variable gap section to the bottom of screen 224.

In FIG. 5C, an alternate gap profile for screen 224 is depicted. The solid wound section extends for one foot from the top of screen 224 and has a zero gap width. The variable gap section extends for two feet below the solid wound section of screen 224. The variable gap section has a nonlinear gap profile ranging between zero inches and 0.008 inches. The constant gap section of screen 224 has a gap width of 0.008 inches and extends from the bottom of the variable gap section to the bottom of screen 224.

Figure 6:
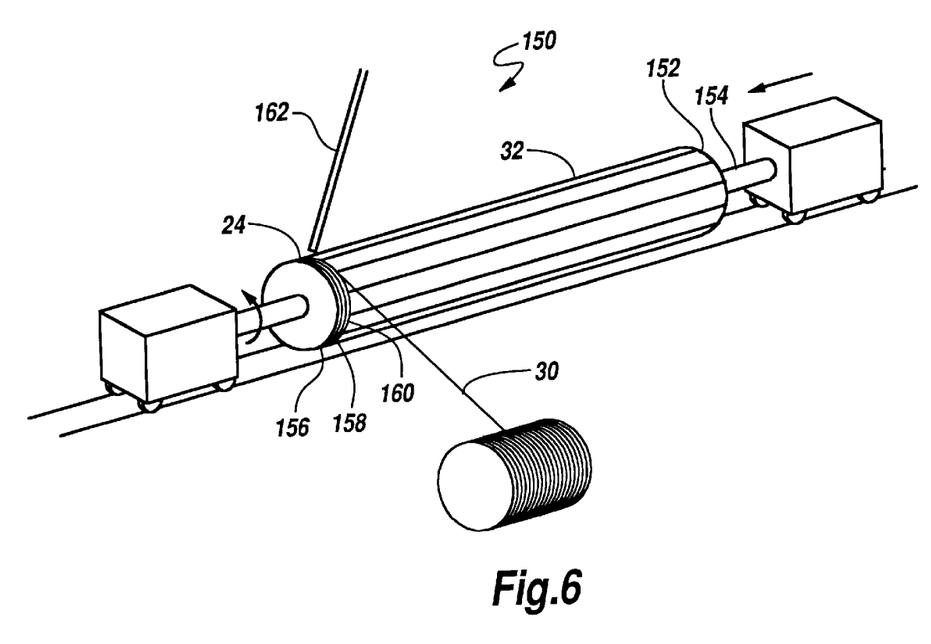
FIG. 6 is a perspective representation of the manufacturing process utilized in conjunction with a progressive gap sand control screen of the present invention.

Referring to FIG. 6, a perspective representation of the manufacturing process utilized in conjunction with progressive gap sand control screen 24 of the present invention is depicted and generally designated 150. Process 150 comprises placing a plurality of ribs 32 into carrier mechanism 152 which has an axis of rotation 154. Ribs 32 are spaced around and oriented about axis 154 to form a generally cylindrical shell for screen 24. Carrier mechanism 152 is rotated about axis of rotation 154 and laterally advanced while screen wire 30 is wrapped around the plurality of ribs 32 forming adjacent turns which have gaps therebetween such as turns 156, 158 and gap 160. Screen wire 30 is adhered to each of the ribs in the plurality of ribs 32 by welding mechanism 162.

The gap profile of screen 24 is a function of the linear velocity and the angular velocity of carrier mechanism 152. By varying either the linear velocity or the angular velocity of carrier mechanism 152 the desired gap profile may be obtained. For example, a gap profile in which said gaps near the upper end of screen 24 are narrower than said gaps near the lower end of screen 24 may be achieved by increasing the linear velocity of carrier mechanism 152 while maintaining a constant angular velocity or decreasing the angular velocity of carrier mechanism 152 while maintaining a constant linear velocity as carrier mechanism 152 laterally advances.

While certain embodiments of the invention have been illustrated for the purposes of this disclosure, numerous changes in the arrangement and construction of the parts may be made by those skilled in the art, such changes being embodied within the scope and spirit of the present invention as defined by the appended claims.

What is claimed is:

1. A progressive gap sand control screen comprising:

a plurality of parallel ribs spaced around an axis, said plurality of ribs having a length; and a screen wire wrapped around said plurality of ribs having turns which extend along the length of the plurality of ribs such that adjacent turns have gaps therebetween, the screen wire forming upper and lower sections each section having a length, the width of the gaps in both the upper and lower sections preventing the passage of particles therethrough, the width of the gaps in the upper section varying at a predetermined rate throughout the length of the upper section, the width of the gaps in the lower section being substantially uniform.

2. The sand control screen as recited in claim 1 wherein the width of said gaps in the upper section is less than the diameter of particles which cause erosion.

3. The sand control screen as recited in claim 1 wherein the width of said gaps in the upper section is less than 50 microns, thereby blocking particles which cause erosion and providing a flow path for fluids.

4. The sand control screen as recited in claim 1 wherein the width of the gaps in the upper section vary linearly.

5. The sand control screen as recited in claim 1 wherein the width of the gaps in the upper section vary in steps.

6. The sand control screen as recited in claim 1 wherein the width of the gaps in the upper section vary nonlinearly.

7. The sand control screen as recited in claim 1 wherein said screen wire further includes a solid wound section above the upper section.

8. A sand control screen apparatus for filtering particles out of fluid produced from a wellbore that is threadably attachable to a pipe string, the apparatus comprising:

a base pipe threadably engageable with said pipe string; and a sand control screen securably attached to said base pipe, said sand control screen comprising a screen wire wrapped around a plurality of parallel ribs disposes about said base pipe, said screen wire forming turns which extend along the length of the plurality of ribs such that adjacent turns have gaps therebetween, the screen wire forming upper and lower sections each section having a length the width of the gaps in both the upper and lower sections preventing the passage of particles therethrough, the width of the gaps in the upper section varying at a predetermined rate throughout the length of the upper section, the width of the gaps in the lower section being substantially uniform.

9. The apparatus as recited in claim 8 wherein the width of said gaps in the upper section is smaller than the diameter of particles which cause erosion.

10. The apparatus as recited in claim 8 wherein the width of said gaps in the upper section is less than 50 microns, thereby blocking particles which cause erosion and providing a flow path for fluids.

11. The apparatus as recited in claim 8 wherein the width of the gaps in the upper section vary linearly.

12. The apparatus as recited in claim 8 wherein the width of the gaps in the upper section vary in steps.

13. The apparatus as recited in claim 8 wherein the width of the gaps in the upper section vary nonlinearly.

14. The apparatus as recited in claim 8 wherein said screen wire includes a solid wound section above the upper section.

15. The apparatus as recited in claim 8 wherein said sand control screen is a sand control screen jacket.

16. A process for manufacturing a progressive gap sand control screen comprising the steps of:

placing a plurality of ribs into a carrier mechanism having an axis of rotation such that said ribs are spaced around and oriented about said axis;

rotating said carrier mechanism about said axis of rotation;

laterally advancing said carrier mechanism;

wrapping a screen wire around said plurality of ribs in said carrier mechanism such that adjacent turns of said screen wire have gaps therebetween; and forming upper and lower sections of the screen wire each section having a length with the width of the gaps in both the upper and lower sections preventing the passage of particles therethrough such that the width of the gaps in the upper section vary at a predetermined rate throughout the length of the upper section and the width of the gaps in the lower section are substantially uniform.

17. The process as recited in claim 16 wherein the step of laterally advancing said carrier mechanism further comprises varying the linear velocity of said carrier mechanism to control said gap profile of the sand control screen.

18. The process as recited in claim 16 wherein the step of rotating said carrier mechanism further comprises varying the angular velocity of said carrier mechanism to control said gap profile of the sand control screen.

* * * * *